United States Patent
Wagner et al.

(10) Patent No.: US 10,048,974 B1
(45) Date of Patent: Aug. 14, 2018

(54) MESSAGE-BASED COMPUTATION REQUEST SCHEDULING

(71) Applicant: Amazon Technologies, Inc., Seattle, WA (US)

(72) Inventors: Timothy Allen Wagner, Seattle, WA (US); Derek Steven Manwarin, Lynwood, WA (US); Sean Philip Reque, Everett, WA (US); Dylan Chandler Thomas, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 386 days.

(21) Appl. No.: 14/502,589

(22) Filed: Sep. 30, 2014

(51) Int. Cl.
*G06F 9/455* (2018.01)
*G06F 9/50* (2006.01)
*H04L 29/08* (2006.01)

(52) U.S. Cl.
CPC ......... *G06F 9/45533* (2013.01); *G06F 9/50* (2013.01)

(58) Field of Classification Search
CPC ..... H04L 67/10; H04L 67/1008; H04L 67/12; H04L 69/26; G06F 3/0631; G06F 3/061; G06F 3/067; G06F 3/0605; G06F 3/0647; G06F 9/45516; G06F 9/5072; G06F 9/45558; G06F 21/10; G06F 9/45533; G06F 9/5077; G06F 2009/4557; H04N 21/4143

See application file for complete search history.

(56) References Cited

U.S. PATENT DOCUMENTS

| | | | |
|---|---|---|---|
| 4,949,254 A | 8/1990 | Shorter | |
| 5,283,888 A | 2/1994 | Dao et al. | |
| 5,970,488 A | 10/1999 | Crowe et al. | |
| 6,708,276 B1 | 3/2004 | Yarsa et al. | |
| 7,036,121 B1 | 4/2006 | Casabona et al. | |
| 7,665,090 B1 | 2/2010 | Tormasov et al. | |
| 7,707,579 B2 | 4/2010 | Rodriguez | |
| 7,730,464 B2 | 6/2010 | Trowbridge | |
| 7,774,191 B2 | 8/2010 | Berkowitz et al. | |
| 7,823,186 B2 | 10/2010 | Pouliot | |
| 7,886,021 B2 | 2/2011 | Scheifler et al. | |

(Continued)

FOREIGN PATENT DOCUMENTS

EP 2663052 A1 11/2013
WO WO 2009/137567 A1 11/2009

(Continued)

OTHER PUBLICATIONS

Kamga et al., Extended scheduler for efficient frequency scaling in virtualized systems, Jul. 2012, 8 pages.*

(Continued)

*Primary Examiner* — Thuy Dao
(74) *Attorney, Agent, or Firm* — Knobbe, Martens, Olson & Bear, LLP

(57) ABSTRACT

A system for routing requests to execute user code based on how frequently the user code is executed is provided. The system may be configured to receive a request to execute user code on a virtual compute system, where the virtual compute system comprises multiple fleets of virtual machine instances. The system may be further configured to determine whether the user code associated with the request satisfies one or more usage criteria, and based on the determination, route the request to the appropriate fleet of virtual machine instances.

20 Claims, 5 Drawing Sheets

(56) References Cited

U.S. PATENT DOCUMENTS

| | | | |
|---|---|---|---|
| 8,010,990 B2 | 8/2011 | Ferguson et al. | |
| 8,024,564 B2 | 9/2011 | Bassani et al. | |
| 8,046,765 B2 | 10/2011 | Cherkasova et al. | |
| 8,051,180 B2 | 11/2011 | Mazzaferri et al. | |
| 8,051,266 B2 | 11/2011 | DeVal et al. | |
| 8,066,676 B2 | 11/2011 | Sahai et al. | |
| 8,095,931 B1 | 1/2012 | Chen et al. | |
| 8,127,284 B2 | 2/2012 | Meijer et al. | |
| 8,146,073 B2 | 3/2012 | Sinha | |
| 8,166,304 B2 | 4/2012 | Murase et al. | |
| 8,171,473 B2 | 5/2012 | Lavin | |
| 8,209,695 B1 | 6/2012 | Pruyne et al. | |
| 8,219,987 B1 | 7/2012 | Vlaovic et al. | |
| 8,321,554 B2 | 11/2012 | Dickinson | |
| 8,336,079 B2 | 12/2012 | Budko et al. | |
| 8,429,282 B1 | 4/2013 | Ahuja | |
| 8,448,165 B1 | 5/2013 | Conover | |
| 8,613,070 B1 | 12/2013 | Borzycki et al. | |
| 8,631,130 B2 | 1/2014 | Jackson | |
| 8,677,359 B1 | 3/2014 | Cavage et al. | |
| 8,694,996 B2 | 4/2014 | Cawlfield et al. | |
| 8,719,415 B1 | 5/2014 | Sirota et al. | |
| 8,725,702 B1 | 5/2014 | Raman et al. | |
| 8,756,696 B1 | 6/2014 | Miller | |
| 8,769,519 B2 | 7/2014 | Leitman et al. | |
| 8,806,468 B2 | 8/2014 | Meijer et al. | |
| 8,819,679 B2 | 8/2014 | Agarwal et al. | |
| 8,825,964 B1 | 9/2014 | Sopka et al. | |
| 8,874,952 B2 * | 10/2014 | Tameshige | G06F 9/5077 714/4.1 |
| 8,904,008 B2 | 12/2014 | Calder et al. | |
| 8,997,093 B2 | 3/2015 | Dimitrov | |
| 9,027,087 B2 | 5/2015 | Ishaya et al. | |
| 9,038,068 B2 | 5/2015 | Engle et al. | |
| 9,086,897 B2 | 6/2015 | Oh et al. | |
| 9,092,837 B2 | 7/2015 | Bala et al. | |
| 9,098,528 B2 * | 8/2015 | Wang | G06F 17/302 |
| 9,110,732 B1 | 8/2015 | Forschmiedt et al. | |
| 9,112,813 B2 | 8/2015 | Jackson | |
| 9,146,764 B1 | 9/2015 | Wagner | |
| 9,183,019 B2 | 11/2015 | Kruglick | |
| 9,208,007 B2 | 12/2015 | Harper et al. | |
| 9,223,561 B2 | 12/2015 | Orveillon et al. | |
| 9,223,966 B1 | 12/2015 | Satish et al. | |
| 9,317,689 B2 | 4/2016 | Aissi | |
| 9,323,556 B2 | 4/2016 | Wagner | |
| 9,361,145 B1 | 6/2016 | Wilson et al. | |
| 9,413,626 B2 | 8/2016 | Reque et al. | |
| 9,436,555 B2 | 9/2016 | Dornemann et al. | |
| 9,461,996 B2 | 10/2016 | Hayton et al. | |
| 9,471,775 B1 | 10/2016 | Wagner et al. | |
| 9,483,335 B1 | 11/2016 | Wagner et al. | |
| 9,489,227 B2 | 11/2016 | Oh et al. | |
| 9,537,788 B2 | 1/2017 | Reque et al. | |
| 9,588,790 B1 | 3/2017 | Wagner et al. | |
| 9,600,312 B2 | 3/2017 | Wagner et al. | |
| 9,652,306 B1 | 5/2017 | Wagner et al. | |
| 9,652,617 B1 | 5/2017 | Evans et al. | |
| 9,661,011 B1 | 5/2017 | Van Horenbeeck et al. | |
| 9,678,773 B1 | 6/2017 | Wagner et al. | |
| 9,678,778 B1 | 6/2017 | Youseff | |
| 9,715,402 B2 | 7/2017 | Wagner et al. | |
| 9,727,725 B2 | 8/2017 | Wagner et al. | |
| 9,733,967 B2 | 8/2017 | Wagner et al. | |
| 9,760,387 B2 | 9/2017 | Wagner et al. | |
| 9,785,476 B2 | 10/2017 | Wagner et al. | |
| 9,811,363 B1 * | 11/2017 | Wagner | G06F 9/45516 |
| 9,811,434 B1 | 11/2017 | Wagner | |
| 9,830,175 B1 | 11/2017 | Wagner | |
| 9,830,193 B1 | 11/2017 | Wagner et al. | |
| 9,830,449 B1 | 11/2017 | Wagner | |
| 9,921,864 B2 * | 3/2018 | Singaravelu | G06F 9/45537 |
| 2002/0172273 A1 | 11/2002 | Baker et al. | |
| 2003/0071842 A1 | 4/2003 | King et al. | |
| 2003/0084434 A1 | 5/2003 | Ren | |
| 2004/0249947 A1 | 12/2004 | Novaes et al. | |
| 2004/0268358 A1 * | 12/2004 | Darling | H04L 29/06 718/105 |
| 2005/0044301 A1 | 2/2005 | Vasilevsky et al. | |
| 2005/0132167 A1 | 6/2005 | Longobardi | |
| 2005/0132368 A1 | 6/2005 | Sexton et al. | |
| 2005/0193113 A1 | 9/2005 | Kokusho et al. | |
| 2005/0193283 A1 | 9/2005 | Reinhardt et al. | |
| 2005/0257051 A1 | 11/2005 | Richard | |
| 2006/0123066 A1 | 6/2006 | Jacobs et al. | |
| 2006/0129684 A1 | 6/2006 | Datta | |
| 2006/0184669 A1 | 8/2006 | Vaidyanathan et al. | |
| 2006/0200668 A1 | 9/2006 | Hybre et al. | |
| 2006/0212332 A1 | 9/2006 | Jackson | |
| 2006/0242647 A1 | 10/2006 | Kimbrel et al. | |
| 2006/0248195 A1 * | 11/2006 | Toumura | H04L 67/1021 709/226 |
| 2007/0094396 A1 | 4/2007 | Takano et al. | |
| 2007/0130341 A1 | 6/2007 | Ma | |
| 2007/0255604 A1 | 11/2007 | Seelig | |
| 2008/0028409 A1 | 1/2008 | Cherkasova et al. | |
| 2008/0082977 A1 | 4/2008 | Araujo et al. | |
| 2008/0104247 A1 | 5/2008 | Venkatakrishnan et al. | |
| 2008/0104608 A1 | 5/2008 | Hyser et al. | |
| 2008/0126110 A1 | 5/2008 | Haeberle et al. | |
| 2008/0126486 A1 | 5/2008 | Heist | |
| 2008/0189468 A1 | 8/2008 | Schmidt et al. | |
| 2008/0201711 A1 | 8/2008 | Husain | |
| 2009/0013153 A1 | 1/2009 | Hilton | |
| 2009/0025009 A1 | 1/2009 | Brunswig et al. | |
| 2009/0055810 A1 | 2/2009 | Kondur | |
| 2009/0055829 A1 | 2/2009 | Gibson | |
| 2009/0070355 A1 | 3/2009 | Cadarette et al. | |
| 2009/0077569 A1 | 3/2009 | Appleton et al. | |
| 2009/0125902 A1 | 5/2009 | Ghosh et al. | |
| 2009/0158275 A1 | 6/2009 | Wang et al. | |
| 2009/0193410 A1 | 7/2009 | Arthursson et al. | |
| 2009/0198769 A1 | 8/2009 | Keller et al. | |
| 2009/0204964 A1 | 8/2009 | Foley et al. | |
| 2009/0288084 A1 | 11/2009 | Astete et al. | |
| 2009/0300599 A1 | 12/2009 | Piotrowski | |
| 2010/0023940 A1 | 1/2010 | Iwamatsu et al. | |
| 2010/0031274 A1 | 2/2010 | Sim-Tang | |
| 2010/0031325 A1 | 2/2010 | Maigne et al. | |
| 2010/0036925 A1 | 2/2010 | Haffner | |
| 2010/0064299 A1 | 3/2010 | Kacin et al. | |
| 2010/0070678 A1 | 3/2010 | Zhang et al. | |
| 2010/0070725 A1 | 3/2010 | Prahlad et al. | |
| 2010/0114825 A1 | 5/2010 | Siddegowda | |
| 2010/0115098 A1 | 5/2010 | De Baer et al. | |
| 2010/0122343 A1 | 5/2010 | Ghosh | |
| 2010/0131959 A1 | 5/2010 | Spiers et al. | |
| 2010/0186011 A1 | 7/2010 | Magenheimer | |
| 2010/0198972 A1 | 8/2010 | Umbehocker | |
| 2010/0199285 A1 | 8/2010 | Medovich | |
| 2010/0257116 A1 | 10/2010 | Mehta et al. | |
| 2010/0269109 A1 | 10/2010 | Cartales | |
| 2011/0010722 A1 * | 1/2011 | Matsuyama | G06F 12/08 718/103 |
| 2011/0029970 A1 | 2/2011 | Arasaratnam | |
| 2011/0055378 A1 | 3/2011 | Ferris et al. | |
| 2011/0055396 A1 | 3/2011 | DeHaan | |
| 2011/0099551 A1 | 4/2011 | Fahrig et al. | |
| 2011/0131572 A1 | 6/2011 | Elyashev et al. | |
| 2011/0134761 A1 | 6/2011 | Smith | |
| 2011/0141124 A1 | 6/2011 | Halls et al. | |
| 2011/0153727 A1 | 6/2011 | Li | |
| 2011/0153838 A1 | 6/2011 | Belkine et al. | |
| 2011/0154353 A1 | 6/2011 | Theroux et al. | |
| 2011/0184993 A1 | 7/2011 | Chawla et al. | |
| 2011/0265164 A1 | 10/2011 | Lucovsky | |
| 2011/0314465 A1 | 12/2011 | Smith et al. | |
| 2011/0321033 A1 | 12/2011 | Kelkar et al. | |
| 2012/0016721 A1 | 1/2012 | Weinman | |
| 2012/0041970 A1 | 2/2012 | Ghosh et al. | |
| 2012/0054744 A1 | 3/2012 | Singh et al. | |
| 2012/0072914 A1 | 3/2012 | Ota | |
| 2012/0096271 A1 | 4/2012 | Ramarathinam et al. | |
| 2012/0096468 A1 | 4/2012 | Chakravorty et al. | |

(56) References Cited

U.S. PATENT DOCUMENTS

| | | |
|---|---|---|
| 2012/0102307 A1 | 4/2012 | Wong |
| 2012/0102333 A1 | 4/2012 | Wong |
| 2012/0110155 A1 | 5/2012 | Adlung et al. |
| 2012/0110164 A1 | 5/2012 | Frey et al. |
| 2012/0110588 A1 | 5/2012 | Bieswanger et al. |
| 2012/0131379 A1* | 5/2012 | Tameshige ............ G06F 9/5077 714/4.11 |
| 2012/0192184 A1 | 7/2012 | Burckart et al. |
| 2012/0197958 A1 | 8/2012 | Nightingale et al. |
| 2012/0233464 A1 | 9/2012 | Miller et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0067494 A1 | 3/2013 | Srour et al. |
| 2013/0080641 A1 | 3/2013 | Lui et al. |
| 2013/0097601 A1 | 4/2013 | Podvratnik et al. |
| 2013/0111469 A1 | 5/2013 | B et al. |
| 2013/0132942 A1 | 5/2013 | Wang |
| 2013/0139152 A1 | 5/2013 | Chang et al. |
| 2013/0139166 A1 | 5/2013 | Zhang et al. |
| 2013/0151648 A1 | 6/2013 | Luna |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0185729 A1 | 7/2013 | Vasic et al. |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0205092 A1 | 8/2013 | Roy et al. |
| 2013/0219390 A1 | 8/2013 | Lee et al. |
| 2013/0227097 A1 | 8/2013 | Yasuda et al. |
| 2013/0227563 A1 | 8/2013 | Mcgrath |
| 2013/0227641 A1 | 8/2013 | White et al. |
| 2013/0232480 A1 | 9/2013 | Winterfeldt et al. |
| 2013/0239125 A1 | 9/2013 | Iorio |
| 2013/0263117 A1 | 10/2013 | Konik et al. |
| 2013/0275975 A1* | 10/2013 | Masuda ................ G06F 9/5077 718/1 |
| 2013/0297964 A1 | 11/2013 | Hegdal et al. |
| 2013/0339950 A1 | 12/2013 | Ramarathinam et al. |
| 2013/0346946 A1 | 12/2013 | Pinnix |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0059226 A1 | 2/2014 | Messerli et al. |
| 2014/0068611 A1 | 3/2014 | McGrath et al. |
| 2014/0082165 A1 | 3/2014 | Marr et al. |
| 2014/0101649 A1 | 4/2014 | Kamble et al. |
| 2014/0109087 A1 | 4/2014 | Jujare et al. |
| 2014/0109088 A1 | 4/2014 | Dournov et al. |
| 2014/0129667 A1* | 5/2014 | Ozawa .................... H04W 4/18 709/213 |
| 2014/0130040 A1 | 5/2014 | Lemanski |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0201735 A1 | 7/2014 | Kannan et al. |
| 2014/0207912 A1 | 7/2014 | Thibeault |
| 2014/0215073 A1 | 7/2014 | Dow et al. |
| 2014/0245297 A1 | 8/2014 | Hackett |
| 2014/0279581 A1 | 9/2014 | Devereaux |
| 2014/0280325 A1 | 9/2014 | Krishnamurthy et al. |
| 2014/0282615 A1 | 9/2014 | Cavage et al. |
| 2014/0289286 A1 | 9/2014 | Gusak |
| 2014/0304698 A1 | 10/2014 | Chigurapati et al. |
| 2014/0304815 A1 | 10/2014 | Maeda |
| 2014/0380085 A1 | 12/2014 | Rash et al. |
| 2015/0039891 A1 | 2/2015 | Ignatchenko et al. |
| 2015/0052258 A1 | 2/2015 | Johnson et al. |
| 2015/0074659 A1 | 3/2015 | Madsen et al. |
| 2015/0081885 A1 | 3/2015 | Thomas et al. |
| 2015/0106805 A1 | 4/2015 | Melander et al. |
| 2015/0120928 A1 | 4/2015 | Gummaraju et al. |
| 2015/0135287 A1 | 5/2015 | Medeiros et al. |
| 2015/0143381 A1 | 5/2015 | Chin et al. |
| 2015/0178110 A1 | 6/2015 | Li et al. |
| 2015/0186129 A1 | 7/2015 | Apte et al. |
| 2015/0235144 A1 | 8/2015 | Gusev et al. |
| 2015/0242225 A1 | 8/2015 | Muller et al. |
| 2015/0256621 A1 | 9/2015 | Noda et al. |
| 2015/0261578 A1 | 9/2015 | Greden et al. |
| 2015/0289220 A1 | 10/2015 | Kim et al. |
| 2015/0319160 A1 | 11/2015 | Ferguson et al. |
| 2015/0332048 A1 | 11/2015 | Mooring et al. |
| 2015/0350701 A1 | 12/2015 | Lemus et al. |
| 2015/0363181 A1 | 12/2015 | Alberti et al. |
| 2015/0371244 A1 | 12/2015 | Neuse et al. |
| 2015/0378762 A1* | 12/2015 | Saladi ................ H04L 41/0816 718/1 |
| 2015/0378764 A1 | 12/2015 | Sivasubramanian et al. |
| 2015/0378765 A1 | 12/2015 | Singh et al. |
| 2016/0012099 A1 | 1/2016 | Tuatini et al. |
| 2016/0026486 A1* | 1/2016 | Abdallah ............... G06F 9/3818 703/26 |
| 2016/0072727 A1 | 3/2016 | Leafe et al. |
| 2016/0092250 A1 | 3/2016 | Wagner et al. |
| 2016/0098285 A1 | 4/2016 | Davis et al. |
| 2016/0100036 A1 | 4/2016 | Lo et al. |
| 2016/0140180 A1 | 5/2016 | Park et al. |
| 2016/0224360 A1 | 8/2016 | Wagner et al. |
| 2016/0224785 A1 | 8/2016 | Wagner et al. |
| 2016/0239318 A1 | 8/2016 | Wagner |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0299790 A1 | 10/2016 | Thompson |
| 2016/0301739 A1 | 10/2016 | Thompson |
| 2016/0364265 A1 | 12/2016 | Cao et al. |
| 2016/0371127 A1 | 12/2016 | Antony et al. |
| 2017/0085447 A1 | 3/2017 | Chen et al. |
| 2017/0090961 A1 | 3/2017 | Wagner et al. |
| 2017/0093920 A1 | 3/2017 | Ducatel et al. |
| 2017/0116051 A1 | 4/2017 | Wagner et al. |
| 2017/0177391 A1 | 6/2017 | Wagner et al. |
| 2017/0177413 A1 | 6/2017 | Wisniewski et al. |
| 2017/0192804 A1 | 7/2017 | Wagner |
| 2017/0199766 A1 | 7/2017 | Wagner et al. |
| 2017/0206116 A1 | 7/2017 | Reque et al. |
| 2017/0286143 A1 | 10/2017 | Wagner et al. |
| 2017/0286156 A1 | 10/2017 | Wagner et al. |
| 2017/0371703 A1 | 12/2017 | Wagner et al. |
| 2017/0371706 A1 | 12/2017 | Wagner et al. |
| 2017/0371724 A1 | 12/2017 | Wagner et al. |
| 2018/0004553 A1 | 1/2018 | Wagner et al. |
| 2018/0004572 A1 | 1/2018 | Wagner et al. |

FOREIGN PATENT DOCUMENTS

| | | |
|---|---|---|
| WO | WO 2015/078394 A1 | 6/2015 |
| WO | WO 2015/108539 A1 | 7/2015 |
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |

(56) References Cited

FOREIGN PATENT DOCUMENTS

| WO | WO 2016/164638 A1 | 10/2016 |
| WO | WO 2017/112526 A1 | 6/2017 |
| WO | WO 2017/172440 A1 | 10/2017 |

OTHER PUBLICATIONS

Kazempour et al., AASH: an asymmetry-aware scheduler for hypervisors, Jul. 2010, 12 pages.*
Kraft et al., IO performance prediction in consolidated virtualized environments, Mar. 2011, 12 pages.*
Adapter Pattern, Wikipedia, https://en.wikipedia.org/w/index.php?title=Adapter_pattern&oldid=654971255, [retrieved May 26, 2016], 6 pages.
Czajkowski, G., and L. Daynes, Multitasking Without Compromise: A Virtual Machine Evolution 47(4a):60-73, ACM SIGPLAN Notices—Supplemental Issue, Apr. 2012.
Dombrowski, M., et al., Dynamic Monitor Allocation in the Java Virtual Machine, JTRES '31 Oct. 9-11, 2013, pp. 30-37.
Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.
Nakajima, J., et al., Optimizing Virtual Machines Using Hybrid Virtualization, SAC '11, Mar. 21-25, 2011, TaiChung, Taiwan, pp. 573-578.
Qian, H. and D. Medhi, et al., Estimating Optimal Cost of Allocating Virtualized Resources With Dynamic Demand, ITC 2011, Sep. 2011, pp. 320-321.
Shim (computing), Wikipedia, https://en.wikipedia.org/w/index.php?title+Shim_(computing)&oldid+654971528, [retrieved on May 26, 2016], 2 pages.
Vaghani, S.B., Virtual Machine File System, ACM SIGOPS Operating Systems Review 44(4):57-70, Dec. 2010.
Vaquero, L., et al., Dynamically Scaling Applications in the cloud, ACM SIGCOMM Computer Communication Review 41(1):45-52, Jan. 2011.
Zheng, C., and D. Thain, Integrating Containers into Workflows: A Case Study Using Makeflow, Work Queue, and Docker, VTDC '15, Jun. 15, 2015, Portland, Oregon, pp. 31-38.
International Search Report and Written Opinion in PCT/US2015/052810 dated Dec. 17, 2015.
International Search Report and Written Opinion in PCT/US2015/052838 dated Dec. 18, 2015.
International Search Report and Written Opinion in PCT/US2015/052833 dated Jan. 13, 2016.
International Search Report and Written Opinion in PCT/US2015/064071 dated Mar. 16, 2016.
International Search Report and Written Opinion in PCT/US2016/016211 dated Apr. 13, 2016.
International Search Report and Written Opinion in PCT/US2016/026514 dated Jun. 8, 2016.
International Search Report and Written Opinion in PCT/US2016/026520 dated Jul. 5, 2016.
International Search Report and Written Opinion in PCT/US2016/054774 dated Dec. 16, 2016.
Anonymous: "Docker run reference", Dec. 7, 2015, XP055350246, Retrieved from the Internet: URL:https://web.archive.org/web/20151207111702/https:/docs.docker.com/engine/reference/run/ [retrieved on Feb. 28, 2017].
Ben-Yehuda et al., "Deconstructing Amazon EC2 Spot Instance Pricing", ACM Transactions on Economics and Computation 1.3, 2013, 15 pages.
Hoffman, Auto scaling your website with Amazon Web Services (AWS)—Part 2, Cardinalpath, Sep. 2015, 15 pages.
International Preliminary Report on Patentability in PCT/US2015/052810 dated Apr. 4, 2017.
International Preliminary Report on Patentability in PCT/US2015/052838 dated Apr. 4, 2017.
International Preliminary Report on Patentability in PCT/US2015/052833 dated Apr. 4, 2017.
International Preliminary Report on Patentability in PCT/US2015/064071 dated Jun. 6, 2017.
Amazon, "AWS Lambda: Developer Guide", Retrieved from the Internet, Jun. 26, 2016, URL : http://docs.aws.amazon.com/lambda/latest/dg/lambda-dg.pdf.
Balazinska et al., Moirae: History-Enhanced Monitoring, Published: 2007, 12 pages.
Das et al., Adaptive Stream Processing using Dynamic Batch Sizing, 2014, 13 pages.
International Preliminary Report on Patentability in PCT/US2016/016211 dated Aug. 17, 2017.
International Preliminary Report on Patentability in PCT/US2016/026514 dated Oct. 10, 2017.
International Preliminary Report on Patentability in PCT/US2016/026520 dated Oct. 10, 2017.
International Search Report and Written Opinion in PCT/US2016/066997 dated Mar. 20, 2017.
International Search Report and Written Opinion in PCT/US/2017/023564 dated Jun. 6, 2017.
International Search Report and Written Opinion in PCT/US2017/040054 dated Sep. 21, 2017.
International Search Report and Written Opinion in PCT/US2017/039514 dated Oct. 10, 2017.

* cited by examiner

| | Customer ID | Requests per minute | Usage Status |
|---|---|---|---|
| CODE A | 121 | 10 | Normal |
| CODE B | 121 | 870 | Heavy |
| CODE C | 789 | 3500 | Heavy |

500

US 10,048,974 B1

MESSAGE-BASED COMPUTATION REQUEST SCHEDULING

CROSS-REFERENCE TO CONCURRENTLY-FILED APPLICATIONS

The present application's Applicant is concurrently filing the following U.S. patent applications on Sep. 30, 2014:

| | Title |
|---|---|
| 14/502,810 | LOW LATENCY COMPUTATIONAL CAPACITY PROVISIONING |
| 14/502,714 | AUTOMATIC MANAGEMENT OF LOW LATENCY COMPUTATIONAL CAPACITY |
| 14/502,992 | THREADING AS A SERVICE |
| 14/502,648 | PROGRAMMATIC EVENT DETECTION AND MESSAGE GENERATION FOR REQUESTS TO EXECUTE PROGRAM CODE |
| 14/502,741 | PROCESSING EVENT MESSAGES FOR USER REQUESTS TO EXECUTE PROGRAM CODE |
| 14/502,620 | DYNAMIC CODE DEPLOYMENT AND VERSIONING |

The disclosures of the above-referenced applications are hereby incorporated by reference in their entireties.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
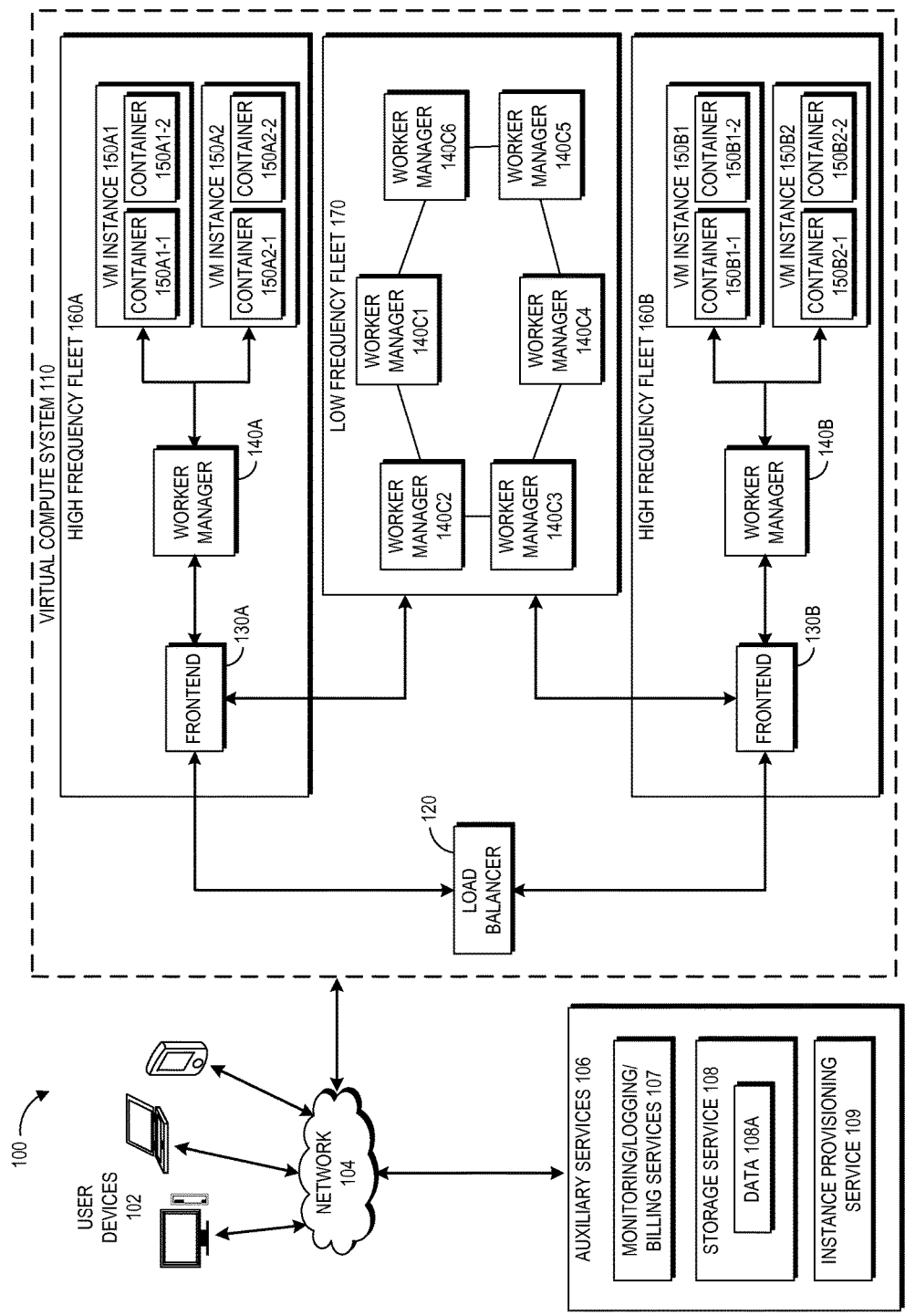
FIG. 1 is a block diagram depicting an illustrative environment for managing virtual machine instances.

Companies and organizations no longer need to acquire and manage their own data centers in order to perform computing operations (e.g., execute code, including threads, programs, software, routines, subroutines, processes, etc.). With the advent of cloud computing, storage space and compute power traditionally provided by hardware computing devices can now be obtained and configured in minutes over the Internet. Thus, developers can quickly purchase a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

However, even when virtual computing resources are purchased, developers still have to decide how many and what type of virtual machine instances to purchase, and how long to keep them. For example, the costs of using the virtual machine instances may vary depending on the type and the number of hours they are rented. In addition, the minimum time a virtual machine may be rented is typically on the order of hours. Further, developers have to specify the hardware and software resources (e.g., type of operating systems and language runtimes, etc.) to install on the virtual machines. Other concerns that they might have include over-utilization (e.g., acquiring too little computing resources and suffering performance issues), under-utilization (e.g., acquiring more computing resources than necessary to run the code, and thus overpaying), prediction of change in traffic (e.g., so that they know when to scale up or down), and instance and language runtime startup delay, which can take 3-10 minutes, or longer, even though users may desire computing capacity on the order of seconds or even milliseconds. Thus, an improved method of allowing users to take advantage of the virtual machine instances provided by service providers is desired.

According to aspects of the present disclosure, by routing the requests to execute user code on a virtual compute fleet (e.g., a group of virtual machine instances that may be used to service such requests) based on the frequency of execution of the user code, high frequency user codes can achieve high distribution (e.g., which is good for fault tolerance) and low frequency user codes can achieve high consolidation (e.g., which is good for cost reduction).

Generally described, aspects of the present disclosure relate to the management of virtual machine instances and containers created therein. Specifically, systems and methods are disclosed which facilitate the handling of requests to execute user code on a virtual compute fleet by utilizing the containers created on the virtual machine instances as compute capacity. Upon receiving a request to execute user code on the virtual compute fleet, a frontend service associated with the virtual compute fleet routes requests to execute user code to different virtual compute fleets based on the execution frequency of the user code and/or other criteria. Thus, users whose codes are frequently executed can achieve improved fault tolerance, and users whose codes are executed less frequently can achieve lower latency (e.g., due to better caching of those codes). The virtual compute system provider may also receive cost savings through more efficient use of resources (e.g., by allowing increased utilization of existing resources). The virtual compute system provider may then choose to price such a service in a way that passes on the cost savings to the user.

In another aspect, a frontend service may receive a request to execute a program code of a user on a virtual compute fleet, wherein the virtual compute fleet comprises at least one low frequency fleet configured to process low frequency requests and at least one high frequency fleet configured to process high frequency requests. Upon receiving the request, the frontend service may determine, based on user code data associated with the program code of the user, whether the request satisfies one or more usage criteria. In response to determining that the program code does not satisfy the one or more usage criteria, the frontend service route the request to the low frequency fleet of virtual machine instances. In some embodiments, the frontend service may route the request to one of multiple fleets (e.g., low, medium, and high) based on the one or more usage criteria.

Specific embodiments and example applications of the present disclosure will now be described with reference to the drawings. These embodiments and example applications are intended to illustrate, and not limit, the present disclosure.

With reference to FIG. 1, a block diagram illustrating an embodiment of a virtual environment 100 will be described. The example shown in FIG. 1 includes a virtual environment 100 in which users (e.g., developers, etc.) of user computing devices 102 may run various program codes using the virtual computing resources provided by a virtual compute system 110.

By way of illustration, various example user computing devices 102 are shown in communication with the virtual compute system 110, including a desktop computer, laptop, and a mobile phone. In general, the user computing devices 102 can be any computing device such as a desktop, laptop, mobile phone (or smartphone), tablet, kiosk, wireless device, and other electronic devices. In addition, the user computing devices 102 may include web services running on the same or different data centers, where, for example, different web services may programmatically communicate with each other to perform one or more techniques described herein. Further, the user computing devices 102 may include Internet of Things (IoT) devices such as Internet appliances and connected devices. The virtual compute system 110 may provide the user computing devices 102 with one or more user interfaces, command-line interfaces (CLI), application programming interfaces (API), and/or other programmatic interfaces for generating and uploading user codes, invoking the user codes (e.g., submitting a request to execute the user codes on the virtual compute system 110), scheduling event-based jobs or timed jobs, tracking the user codes, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The user computing devices 102 access the virtual compute system 110 over a network 104. The network 104 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. For example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The virtual compute system 110 is depicted in FIG. 1 as operating in a distributed computing environment including several computer systems that are interconnected using one or more computer networks. The virtual compute system 110 could also operate within a computing environment having a fewer or greater number of devices than are illustrated in FIG. 1. Thus, the depiction of the virtual compute system 110 in FIG. 1 should be taken as illustrative and not limiting to the present disclosure. For example, the virtual compute system 110 or various constituents thereof could implement various Web services components, hosted or "cloud" computing environments, and/or peer-to-peer network configurations to implement at least a portion of the processes described herein.

Further, the virtual compute system 110 may be implemented in hardware and/or software and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

In the environment illustrated FIG. 1, the virtual environment 100 includes a virtual compute system 110, which includes a load balancer 120, high frequency fleets 160A, 160B, and a low frequency fleet 170. Although in the example of FIG. 1, the virtual compute system 110 includes two high frequency fleets and one low frequency fleet, the embodiments described herein are not limited as such, and the virtual compute system 110 may have any number of high and low frequency fleets.

In the example of FIG. 1, the virtual compute system 110 is illustrated as being connected to the network 104. In some embodiments, any of the components within the virtual compute system 110 can communicate with other components (e.g., the user computing devices 102 and auxiliary services 106, which may include monitoring/logging/billing services 107, storage service 108, an instance provisioning service 109, and/or other services that may communicate with the virtual compute system 110) of the virtual environment 100 via the network 104. In other embodiments, not all components of the virtual compute system 110 are capable of communicating with other components of the virtual environment 100. In one example, only the load balancer 120 and/or the frontends 130 may be connected to the network 104, and other components of the virtual compute system 110 may communicate with other components of the virtual environment 100 via the load balancer 120 and/or the frontends 130.

Users may use the virtual compute system 110 to execute user code thereon. For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. Alternatively, the user may send the virtual compute system 110 a code execution request. The virtual compute system 110 can handle the acquisition and configuration of compute capacity (e.g., containers, instances, etc., which are described in greater detail below) based on the code execution request, and execute the code using the compute capacity. The virtual compute system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying).

In the configuration depicted in FIG. 1, the high frequency fleet 160A includes a frontend 130A, a worker manager 140A, and virtual machine instances 150A1, 150A2, 150A3. Similarly, the high frequency fleet 160B includes a frontend 130B, a worker manager 140B, and virtual machine instances 150B1, 150B2, 150B3. The low frequency fleet 170 includes worker managers 140C1, 140C2, 140C3, 140C4, 140C5, and 140C6. The high frequency fleets and the low frequency fleet are not limited to the configuration illustrated in FIG. 1, and the fleets may include fewer or more components. For example, the fleets can include any number of worker managers, and each worker manager can manage any number of virtual machine instances. In some embodiments, the frontend 130A and the worker manager 140A are resident on a single virtual machine instance. Similarly, the front end 130B and the worker manager 140B may be resident on a single virtual machine instance. In other embodiments, the frontends 130A, 130B and the worker managers 140A, 140B reside on different virtual machine instances.

In some embodiments, the load balancer 120 serves as a front door to all the other services provided by the virtual compute system 110. The load balancer 120 processes requests to execute user code on the virtual compute system 110 and handles the first level of load balancing across the frontends 130. For example, the load balancer 120 may distribute the requests among the frontends 130 (e.g., based on the individual capacity of the frontends 130). In one embodiment, the requests are distributed evenly across the frontends 130. In another embodiment, the requests are distributed based on the available capacity on the high frequency fleets 160. For example, the number of requests sent to each frontend 130 (or the rate at which the requests are sent to each frontend 130) may be proportional to the capacity available (or inversely proportional to the current workload) on the corresponding high frequency fleet 160.

The user code as used herein may refer to any program code (e.g., a program, routine, subroutine, thread, etc.) written in a program language. Such user code may be executed to achieve a specific task, for example, in connection with a particular web application or mobile application developed by the user. For example, the user code may be written in JavaScript (node.js), Java, Python, and/or Ruby. The request may include the user code (or the location thereof) and one or more arguments to be used for executing the user code. For example, the user may provide the user code along with the request to execute the user code. In another example, the request may identify a previously uploaded program code (e.g., using the API for uploading the code) by its name or its unique ID. In yet another example, the code may be included in the request as well as uploaded in a separate location (e.g., the storage service 108 or a storage system internal to the virtual compute system 110) prior to the request is received by the virtual compute system 110. The virtual compute system 110 may vary its code execution strategy based on where the code is available at the time the request is processed.

In some embodiments, the frontend 130 determines that the requests are properly authorized. For example, the frontend 130 may determine whether the user associated with the request is authorized to access the user code specified in the request.

The frontend 130 may receive the request to execute such user code in response to Hypertext Transfer Protocol Secure (HTTPS) requests from a user. Also, any information (e.g., headers and parameters) included in the HTTPS request may also be processed and utilized when executing the user code. As discussed above, any other protocols, including, for example, HTTP, MQTT, and CoAP, may be used to transfer the message containing the code execution request to the frontend 130. The frontend 130 may also receive the request to execute such user code when an event is detected, such as an event that the user has registered to trigger automatic request generation. For example, the user may have registered the user code with an auxiliary service 106 and specified that whenever a particular event occurs (e.g., a new file is uploaded), the request to execute the user code is sent to the frontend 130. Alternatively, the user may have registered a timed job (e.g., execute the user code every 24 hours). In such an example, when the scheduled time arrives for the timed job, the request to execute the user code may be sent to the frontend 130. In yet another example, the frontend 130 may have a queue of incoming code execution requests, and when the user's batch job is removed from the virtual compute system's work queue, the frontend 130 may process the user request. In yet another example, the request may originate from another component within the virtual compute system 110 or other servers or services not illustrated in FIG. 1.

A user request may specify one or more third-party libraries (including native libraries) to be used along with the user code. In one embodiment, the user request is a ZIP file containing the user code and any libraries (and/or identifications of storage locations thereof) that are to be used in connection with executing the user code. In some embodiments, the user request includes metadata that indicates the program code to be executed, the language in which the program code is written, the user associated with the request, and/or the computing resources (e.g., memory, etc.) to be reserved for executing the program code. For example, the program code may be provided with the request, previously uploaded by the user, provided by the virtual compute system 110 (e.g., standard routines), and/or provided by third parties. In some embodiments, such resource-level constraints (e.g., how much memory is to be allocated for executing a particular user code) are specified for the particular user code, and may not vary over each execution of the user code. In such cases, the virtual compute system 110 may have access to such resource-level constraints before each individual request is received, and the individual requests may not specify such resource-level constraints. In some embodiments, the user request may specify other constraints such as permission data that indicates what kind of permissions that the request has to execute the user code. Such permission data may be used by the virtual compute system 110 to access private resources (e.g., on a private network).

In some embodiments, the user request may specify the behavior that should be adopted for handling the user request. In such embodiments, the user request may include an indicator for enabling one or more execution modes in which the user code associated with the user request is to be executed. For example, the request may include a flag or a header for indicating whether the user code should be executed in a debug mode in which the debugging and/or logging output that may be generated in connection with the execution of the user code is provided back to the user (e.g., via a console user interface). In such an example, the virtual compute system 110 may inspect the request and look for the flag or the header, and if it is present, the virtual compute system 110 may modify the behavior (e.g., logging facilities) of the container in which the user code is executed, and cause the output data to be provided back to the user. In some embodiments, the behavior/mode indicators are added to the request by the user interface provided to the user by the virtual compute system 110. Other features such as source code profiling, remote debugging, etc. may also be enabled or disabled based on the indication provided in the request.

The frontend 130 receives requests to execute user code on the virtual compute system 110 that have been processed by the load balancer 120. Upon receiving a request to execute user code on the virtual compute system 110, the frontend 130 determines whether the user code specified by the request is sufficiently frequently executed such that the request should be handled by the high frequency fleet 160 associated with the frontend 130 or not sufficiently frequently executed such that the request should be sent to the low frequency fleet 170. For example, user codes that are sufficiently frequently executed on the virtual compute system 110 may benefit from high distribution (e.g., code execution taking place in multiple instances and multiple containers). For example, if there are a lot of requests from a particular user or a lot of requests to execute a particular code, there may be a lot of instances and containers (e.g., across boundaries of hardware, networking, and/or software) handling those requests. For example, the various instances, and supported containers, may be distributed in various ways, such as across multiple geographically dispersed data centers, sections of a given data center (e.g., such as opposite sides of a building), different racks within a data center, different power grids, and various logical manners, such as network connections and software groupings. User codes that are sufficiently frequently executed on the virtual compute system 110 benefit from such high distribution because by having a lot of instances and containers across hardware/networking/software boundaries (e.g., in different data centers, parts of data centers, racks within a data center, equivalence class for software updates or patches, machines that share a common network connection to the Internet, shared power grids, etc.) will increase fault tolerance. By doing so, even if some of the containers, instances, or groups of instances fail, the remaining compute capacity associated with the user codes can still handle the incoming requests. On the other hand, user codes that are not sufficiently frequently executed on the virtual compute system 110 may benefit from high consolidation (e.g., code execution taking place in an isolated number of containers or instances), because such an approach would increase the likelihood that the user codes are already loaded onto one or more containers at the time the request associated with those user codes are received, thereby achieving lower latency (e.g., due to better caching of those codes). The service provider may receive a cost savings via consolidation of low frequency user codes to increase the utilization of existing hardware and software resources. The service provider may price the service in such a way to pass these cost savings on to the user. In some embodiments, the frontend 130 determines whether the user code is sufficiently frequently executed by determining whether the frequency of execution of the user code exceeds a threshold value. For example, the frontend 130 may determine whether the transactions per second (TPS) associated with the user code exceeds a threshold TPS value. The threshold TPS value may be 10, 100, or 1000. In another example, the frontend 130 may determine whether the user ID associated with the user code is a high-volume user responsible for a sufficiently large number of requests sent to the virtual compute system 110. The determination of whether the frequency of execution of the user code exceeds a threshold value may be based on historical data retrieved from a database, live data calculated on the fly, or a combination thereof. The threshold value may be determined automatically by monitoring the trend of user code execution. Alternatively, the threshold value may be set manually to one of many different configuration policies.

The frontend 130 may make such determinations by accessing a data store that is maintained either by the virtual compute system 110 or by an auxiliary service 106 (e.g., storage service 108). The virtual compute system 110 may store user code, metadata associated with the user code, user code data retrieved or generated based on the incoming requests, and/or configuration data supplied by the user (e.g., included or indicated in the request). For example, the data stored by the virtual compute system 110 (e.g., referred to herein as user code data) may include the user ID of the user associated with the user code, the number of times the user code has been executed, an average TPS associated with the user code, a unique user code ID, an indication of whether the user code is categorized as a high-frequency code or a low-frequency code, etc. The user code data may include an indicator that can be manually activated by the user to indicate the user's preference as to whether size-based instance management should be enabled, or whether the user prefers to have its requests routed to a high- or low-frequency instance manager.

If the frontend 130 determines that the user code is sufficiently frequently executed, the frontend 130 may request the worker manager 140 associated with the frontend 130 to find compute capacity in one of the virtual machine instances 150 managed by the worker manager 140. On the other hand, if the frontend 130 determines that the user code is not sufficiently frequently executed, the request may be sent to the low frequency fleet 170 to be handled by one of the worker managers 140 associated with the low frequency fleet 170.

The frontend 130 may include a usage data manager for determining the usage status (e.g., indicating how frequently the user code is executed) of a particular user code, and a user code execution manager for facilitating the execution of user code on one of the virtual machine instances managed by the worker manager 140. An example configuration of the frontend 130 is described in greater detail below with reference to FIG. 3.

The worker manager 140 manages the virtual machine instances in the virtual compute system 110. After a request has been successfully processed by the load balancer 120 and the frontend 130, the worker manager 140 finds capacity to service the request to execute user code on the virtual compute system 110. For example, if there exists a container on a particular virtual machine instance that has the user code loaded thereon, the worker manager 140 may assign the container to the request and cause the request to be executed in the container. Alternatively, if the user code is available in the local cache of one of the virtual machine instances, the worker manager 140 may create a new container on such an instance, assign the container to the request, and cause the user code to be loaded and executed in the container. Otherwise, the worker manager 140 may assign a new virtual machine instance to the user associated with the request from the pool of pre-initialized and pre-configured virtual machine instances, download the user code onto a container created on the virtual machine instance, and cause the user code to be executed in the container.

In some embodiments, the virtual compute system 110 is adapted to begin execution of the user code shortly after it is received (e.g., by the load balancer 120 or frontend 130). A time period can be determined as the difference in time between initiating execution of the user code (e.g., in a container on a virtual machine instance associated with the user) and receiving a request to execute the user code (e.g., received by a frontend). The virtual compute system 110 is adapted to begin execution of the user code within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the virtual compute system 110 is adapted to begin execution of the user code within a time period that is less than a predetermined duration if one or more conditions are satisfied. For example, the one or more conditions may include any one of: (1) the user code is loaded on an existing container at the time the request is received; (2) the user code is stored in the code cache of an existing instance at the time the request is received; (3) there exists an instance currently assigned to the user associated with the request at the time the request is received; or (4) a pool of pre-warmed (e.g., having one or more software components pre-loaded thereon, before a request is received, to service such a request) before a instances not yet assigned to any user (e.g., "warming pool") has capacity to handle the request at the time the request is received.

The user code may be downloaded from an auxiliary service 106 such as the storage service 108 of FIG. 1. Data 108A illustrated in FIG. 1 may comprise user codes uploaded by one or more users, metadata associated with such user codes, or any other data utilized by the virtual compute system 110 to perform one or more techniques described herein. Although only the storage service 108 is illustrated in the example of FIG. 1, the virtual environment 100 may include other levels of storage systems from which the user code may be downloaded. For example, each instance may have one or more storage systems either physically (e.g., a local storage resident on the physical computing system on which the instance is running) or logically (e.g., a network-attached storage system in network communication with the instance and provided within or outside of the virtual compute system 110) associated with the instance on which the container is created. Alternatively, the code may be downloaded from a web-based data store provided by the storage service 108.

In some embodiments, once the virtual machine instance has been assigned to a particular user, the same virtual machine instance cannot be used to service requests of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's code in a container on a particular instance after another member's code has been executed in another container on the same instance does not pose security risks. Similarly, the worker manager 140 may assign the instances and the containers according to one or more policies that dictate which requests can be executed in which containers and which instances can be assigned to which users. An example policy may specify that instances are assigned to collections of users who share the same account (e.g., account for accessing the services provided by the virtual compute system 110). In some embodiments, the requests associated with the same user group may share the same containers (e.g., if the user codes associated therewith are identical). In some embodiments, a request does not differentiate between the different users of the group and simply indicates the group to which the users associated with the requests belong.

In some embodiments, the virtual compute system 110 may maintain a separate cache in which user codes are stored to serve as an intermediate level of caching system between the local cache of the virtual machine instances and a web-based network storage (e.g., accessible via the network 140).

The worker manager 140 may also manage creation, preparation, and configuration of containers within virtual machine instances. Containers are logical units within a virtual machine instance and utilize resources of the virtual machine instances to execute user code. Based on configuration information associated with a request to execute user code, such a container manager can create containers inside a virtual machine instance. In one embodiment, such containers are implemented as Linux containers.

After the user code has been executed, the worker manager 140 may tear down the container used to execute the user code to free up the resources it occupied to be used for other containers in the instance. Alternatively, the worker manager 140 may keep the container running to use it to service additional requests from the same user. For example, if another request associated with the same user code that has already been loaded in the container, the request can be assigned to the same container, thereby eliminating the delay associated with creating a new container and loading the user code in the container. In some embodiments, the worker manager 140 may tear down the instance in which the container used to execute the user code was created. Alternatively, the worker manager 140 may keep the instance running to use it to service additional requests from the same user. The determination of whether to keep the container and/or the instance running after the user code is done executing may be based on a threshold time, the type of the user, average request volume of the user, and/or other operating conditions. For example, after a threshold time has passed (e.g., 5 minutes, 30 minutes, 1 hour, 24 hours, 30 days, etc.) without any activity (e.g., running of the code), the container and/or the virtual machine instance is shutdown (e.g., deleted, terminated, etc.), and resources allocated thereto are released. In some embodiments, the threshold time passed before a container is torn down is shorter than the threshold time passed before an instance is torn down.

In some embodiments, the virtual compute system 110 may provide data to one or more of the auxiliary services 106 as it services incoming code execution requests. For example, the virtual compute system 110 may communicate with the monitoring/logging/billing services 107. The monitoring/logging/billing services 107 may include: a monitoring service for managing monitoring information received from the virtual compute system 110, such as statuses of containers and instances on the virtual compute system 110; a logging service for managing logging information received from the virtual compute system 110, such as activities performed by containers and instances on the virtual compute system 110; and a billing service for generating billing information associated with executing user code on the virtual compute system 110 (e.g., based on the monitoring information and/or the logging information managed by the monitoring service and the logging service). In addition to the system-level activities that may be performed by the monitoring/logging/billing services 107 (e.g., on behalf of the virtual compute system 110) as described above, the monitoring/logging/billing services 107 may provide application-level services on behalf of the user code executed on the virtual compute system 110. For example, the monitoring/logging/billing services 107 may monitor and/or log various inputs, outputs, or other data and parameters on behalf of the user code being executed on the virtual compute system 110. Although shown as a single block, the monitoring, logging, and billing services 107 may be provided as separate services.

In some embodiments, the worker manager 140 may perform health checks on the instances and containers managed by the worker manager 140 (e.g., an "active pool" of virtual machine instances managed by the worker manager and currently assigned to one or more users). For example, the health checks performed by the worker manager 140 may include determining whether the instances and the containers managed by the worker manager 140 have any issues of (1) misconfigured networking and/or startup configuration, (2) exhausted memory, (3) corrupted file system, (4) incompatible kernel, and/or any other problems that may impair the performance of the instances and the containers. In one embodiment, the worker manager 140 performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests. In some embodiments, the worker manager 140 may perform similar health checks on the instances and/or containers in the pool of pre-warmed virtual machine instances that are not yet assigned to any user but ready to service incoming requests. The instances and/or the containers in such a warming pool may be managed either together with those instances and containers in the active pool or separately. In some embodiments, in the case where the health of the instances and/or the containers in the warming pool is managed separately from the active pool, a separate warming pool manager that manages the warming pool may perform the health checks described above on the instances and/or the containers in the warming pool.

The virtual machine instances 150 are logical in nature and can be implemented by a single or multiple physical computing devices. At least some of the virtual machine instances 150 may be provisioned to provide a variety of different desired conditions depending on the needs of the user. Examples of the types of desired conditions, include but are not limited to: particular operating systems, particular language runtimes, and particular libraries that may be utilized by the user code. Additionally, one or more virtual machine instances may be provisioned generically when a desired operating condition is not specified or is otherwise not available. One skilled in the relevant art will appreciate that the virtual compute system 110 is logical in nature and can encompass physical computing devices from various geographic regions.

The frontends 130 routes code-processing requests according to a method that is different than the method used by the load balancer 120 to route requests among the frontends 130. For example, the frontends 130 route the requests to the specific worker manager based on the user code and/or based on the user associated with the user code. In some embodiments, the routing is determined based on a consistent-hashing scheme in which one or more parameters associated with the request (e.g., user ID, user code ID, etc.) are hashed according to a hash function and the request is sent to one of the worker managers 140 in the low frequency fleet 170 that has previously been assigned to the sections of a hash ring (e.g., containing a plurality of hash values) that corresponds to the resulting hash value. For example, the worker managers 140 occupy one or more sections of the hash ring, and the requests are mapped to those same hash values. In some embodiments, the hash values may be integer values, and each worker manager 140 may be associated with one or more integer values. The one or more integer values associated with a particular worker manager 140 may be determined based on one or more parameters associated with the worker manager 140 (e.g., IP address, instance ID, etc.). In some embodiments, the request may be sent to the worker manager 140 whose associated integer values are closest to, but not larger than, the hash value calculated for that request (e.g., using modulo arithmetic).

When the frontends 130 determine that one or more worker managers 140 have become unavailable, the frontends 130 may associate the hash values previously associated with the one or more worker managers 140 that have become unavailable with one or more available worker managers 140 in the low frequency fleet 170. Similarly, when a new worker manager is added to the low frequency fleet 170, the new worker manager may take a share of the hash values associated with the existing worker managers 140. For example, the new worker manager may be assigned one or more sections of the hash ring that were previously assigned to the existing worker managers 140.

Figure 2:
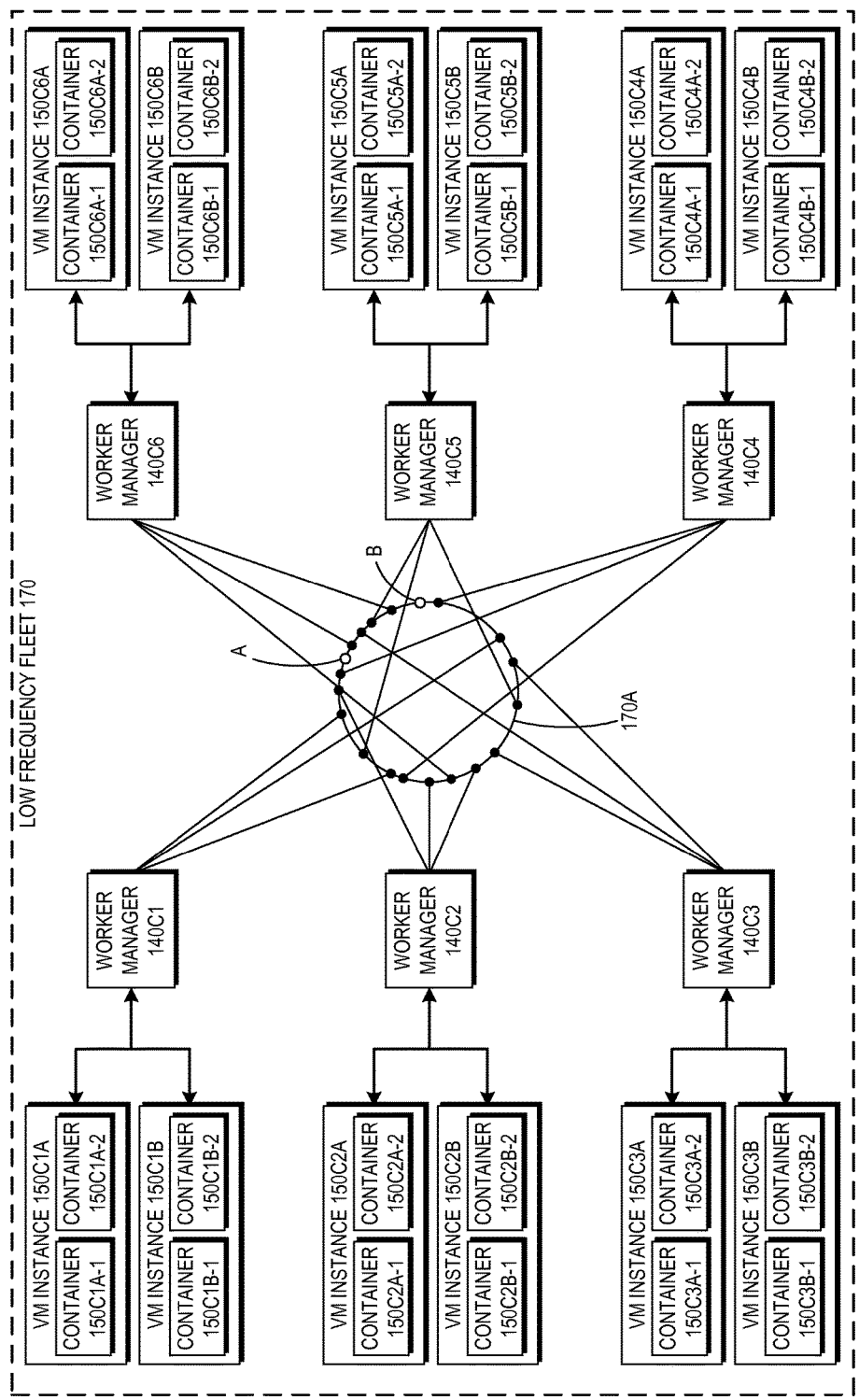
FIG. 2 is a block diagram depicting an example configuration of a low frequency fleet of virtual machine instances.

Turning now to FIG. 2, an example of the low frequency fleet 170 will be described. As illustrated in FIG. 2, the low frequency fleet 170 includes worker managers 140C1, 140C2, 140C3, 140C4, 14005, 14006. The worker manager 140C1 includes VM instances 150C1A, 150C1B, which include containers 150C1A-1, 150C1A-2 and containers 150C1B-1, 150C1B2, respectively. The worker manager 140C2 includes VM instances 150C2A, 150C2B, which include containers 150C2A-1, 150C2A-2 and containers 150C2B-1, 150C2B2, respectively. The worker manager 140C3 includes VM instances 150C3A, 150C3B, which include containers 150C3A-1, 150C3A-2 and containers 150C3B-1, 150C3B2, respectively. The worker manager 140C4 includes VM instances 150C4A, 150C4B, which include containers 150C4A-1, 150C4A-2 and containers 150C4B-1, 150C4B2, respectively. The worker manager 14005 includes VM instances 15005A, 15005B, which include containers 15005A-1, 15005A-2 and containers 15005B-1, 15005B2, respectively. The worker manager 14006 includes VM instances 15006A, 15006B, which include containers 15006A-1, 15006A-2 and containers 15006B-1, 15006B2, respectively.

As illustrated in FIG. 2, the worker managers 140 are mapped onto various points on a hash ring 170A. In the example of FIG. 2, each worker manager is associated with 3 points on the hash ring 170A. In one embodiment, when a request is routed to the low frequency fleet 170, a hash value corresponding to a point on the hash ring 170A is calculated for the request, The particular worker manager 140 to which the request is routed may be determined based on the location of the calculated hash value on the hash ring 170A. In some embodiments, the particular worker manager 140 to which the request is routed is the one having a point on the hash ring 170A that is closest to the location of the calculated hash value of the request in the clockwise direction. For example, if the hash value calculated for "Request A" corresponds to Point A illustrated on the hash ring 170A, "Request A" would be routed to the worker manager 14006. In another example, if the hash value calculated for "Request B" corresponds to Point B illustrated on the hash ring 170A, "Request B" would be routed to the worker manager 140C4. The low frequency fleet 170 of the virtual compute system 110 is not limited to the example illustrated in FIG. 2, and the low frequency fleet 170 may be implemented with any number of worker managers, VM instances, and containers, and each worker manager may have any number of points or locations on the hash ring 170A assigned thereto. Although the hash ring 170A is used in the example of FIG. 2 to route the requests to the various worker managers 140, other request distribution schemes (e.g., rendezvous hashing) may be utilized without departing from the spirit of the present disclosure.

Figure 3:
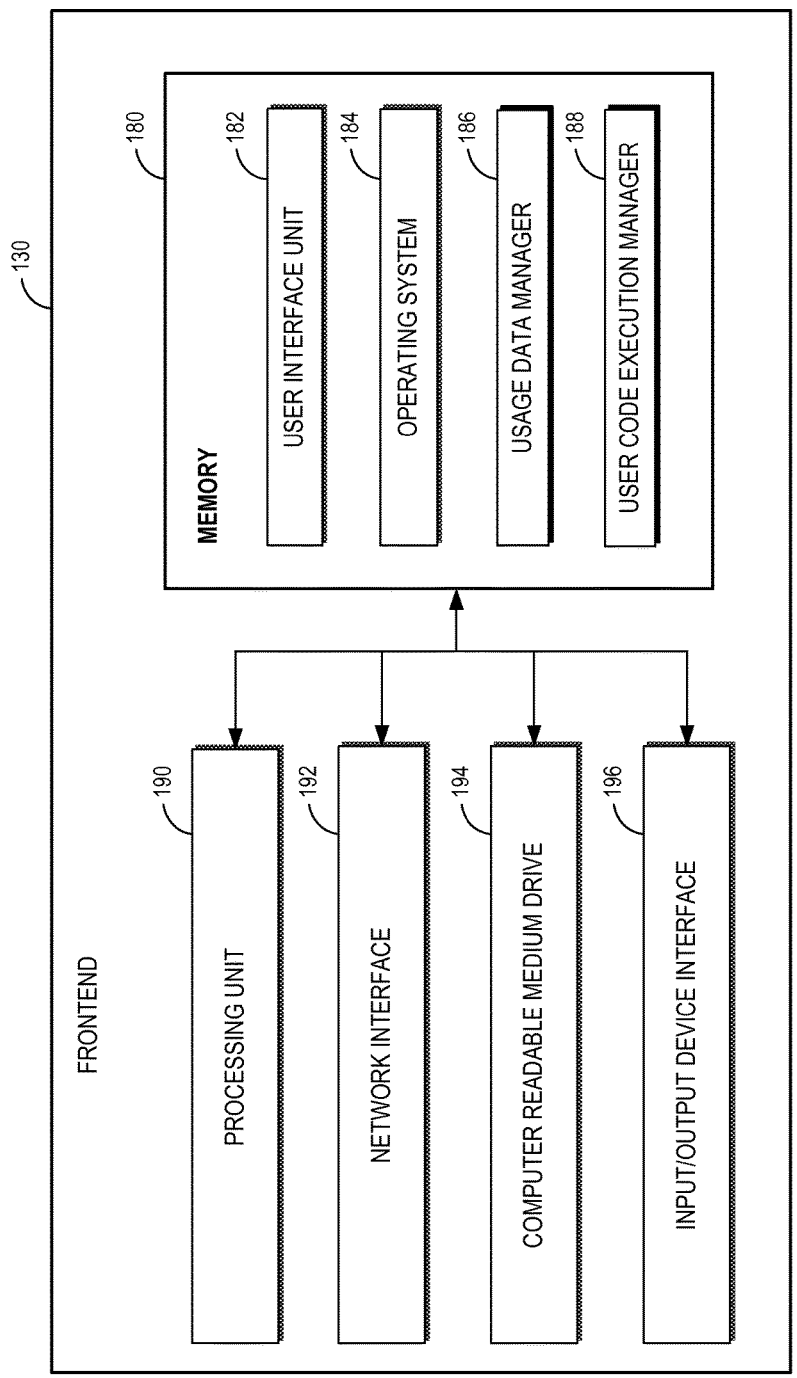
FIG. 3 depicts a general architecture of a computing device providing a frontend for processing user requests to execute program codes.

Turning now to FIG. 3, a general architecture of a computing system (referenced as frontend 130) that handles the requests to execute user code on the virtual compute system 110 will be described. The general architecture of the frontend 130 depicted in FIG. 3 includes an arrangement of computer hardware and software modules that may be used to implement aspects of the present disclosure. The frontend 130 may include many more (or fewer) elements than those shown in FIG. 3. It is not necessary, however, that all of these generally conventional elements be shown in order to provide an enabling disclosure. As illustrated, the frontend 130 includes a processing unit 190, a network interface 192, a computer readable medium drive 194, an input/output device interface 196, all of which may communicate with one another by way of a communication bus. The network interface 192 may provide connectivity to one or more networks or computing systems. The processing unit 190 may thus receive information and instructions from other computing systems or services via the network 104. The processing unit 190 may also communicate to and from memory 180 and further provide output information for an optional display (not shown) via the input/output device interface 196. The input/output device interface 196 may also accept input from an optional input device (not shown).

The memory 180 may contain computer program instructions (grouped as modules in some embodiments) that the processing unit 190 executes in order to implement one or more aspects of the present disclosure. The memory 180 generally includes RAM, ROM and/or other persistent, auxiliary or non-transitory computer-readable media. The memory 180 may store an operating system 184 that provides computer program instructions for use by the processing unit 190 in the general administration and operation of the frontend 130. The memory 180 may further include computer program instructions and other information for implementing aspects of the present disclosure. For example, in one embodiment, the memory 180 includes a user interface unit 182 that generates user interfaces (and/or instructions therefor) for display upon a computing device, e.g., via a navigation and/or browsing interface such as a browser or application installed on the computing device. In addition, memory 180 may include and/or communicate with one or more data repositories (not shown), for example, to access user program codes, libraries, and/or other user code data.

In addition to and/or in combination with the user interface unit 182, the memory 180 may include a usage data manager 186 and a user code execution manager 188 that may be executed by the processing unit 190. In one embodiment, the user interface unit 182, usage data manager 186, and user code execution manager 188 individually or collectively implement various aspects of the present disclosure, e.g., receiving a request to execute user code, determining whether the user code satisfies one or more usage criteria, and routing the request based on the determination, loading the user code on a virtual machine instance, executing the user code on the virtual machine instance, etc. as described further below.

The usage data manager 186 determines whether the user code satisfies one or more usage criteria. In order to make such a determination, the usage data manager 186 may access one or more user code data repositories (not shown) maintained either by the virtual compute system 110 or by an auxiliary service 106. For example, the usage data manager 186 may retrieve user code data associated the user code associated with the request, and based on the user code data, determine whether the user code is sufficiently frequently executed on the virtual compute system 110 (e.g., in which case the user associated with the request may wish to distribute his or her requests over multiple high frequency fleets 160 and multiple virtual machine instances 150 in order to achieve improved fault tolerance) or whether the user code is not sufficiently frequently executed on the virtual compute system 110 (e.g., in which case the user associated with the request may wish to reduce costs associated with executing the user code by re-using the same virtual machine instance 140 in the low frequency fleet 170). The usage data manager 186 routes the request based on the determination.

The user code execution manager 188 manages the execution of the program code specified by the request of the user once a particular virtual machine instance has been assigned to a user. If the code is pre-loaded on the virtual machine instance assigned to the user, the code is simply executed on the virtual machine instance. If the code is available via a network storage (e.g., storage service 108 of FIG. 1), the user code execution manager 188 downloads the code onto the virtual machine instance and executes the code once it has been downloaded. In some embodiments, the user code execution manager 188 executes the user code using the IP address of the virtual machine instance 150 allocated to the request by acting as an HTTP proxy. After the user code has been executed, the user code execution manager 188 may notify the worker manager 140 associated with the frontend 130 to un-reserve the virtual machine instance 150 used to execute the user code.

While the usage data manager 186 and the user code execution manager 188 are shown in FIG. 3 as part of the frontend 130, in other embodiments, all or a portion of the usage data manager 186 and the user code execution manager 188 may be implemented by other components of the virtual compute system 110 and/or another computing device. For example, in certain embodiments of the present disclosure, another computing device in communication with the virtual compute system 110 may include several modules or components that operate similarly to the modules and components illustrated as part of the frontend 130.

Figure 4:
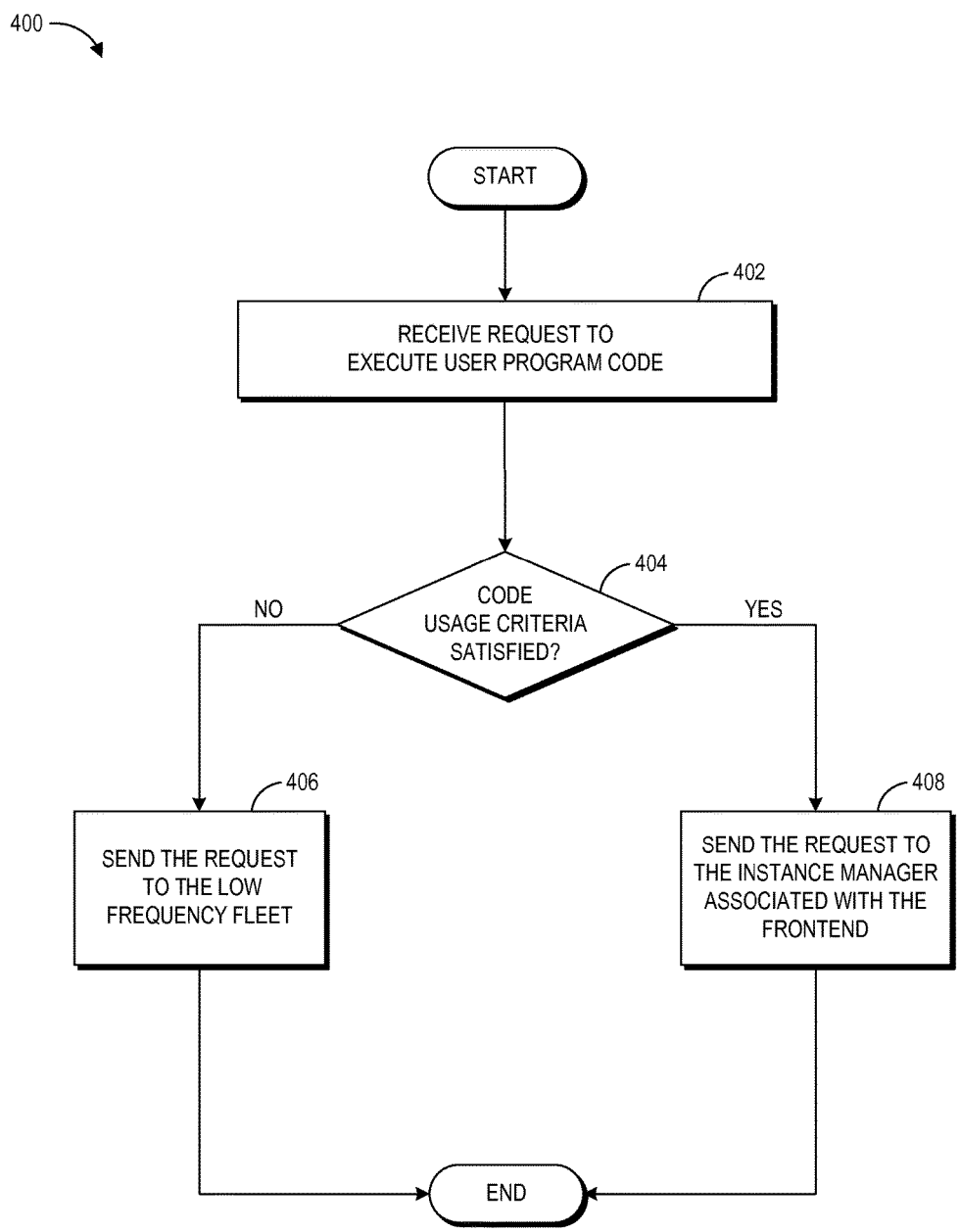
FIG. 4 is a flow diagram illustrating a request scheduling routine implemented by a frontend.

Turning now to FIG. 4, a routine 400 implemented by one or more components of the virtual compute system 110 (e.g., the frontend 130) will be described. Although routine 400 is described with regard to implementation by the frontend 130, one skilled in the relevant art will appreciate that alternative components may implement routine 400 or that one or more of the blocks may be implemented by a different component or in a distributed manner.

At block 402 of the illustrative routine 400, the frontend 130 receives a request to execute user program code on the virtual compute system 110. For example, the request may include one or more parameters related to the user code to be executed, such as the user ID, the user code ID, etc.

Next, at block 404, the frontend 130 determines whether one or more code usage criteria have been satisfied. As discussed herein, the one or more usage criteria may include whether the user code specified by the request is sufficiently frequently executed. The frontend 130 may determine whether the user code is sufficiently frequently executed by determining whether the frequency of execution of the user code exceeds a threshold value. For example, the frontend 130 may determine whether the transactions per second (TPS) associated with the user code exceeds a threshold TPS value. In another example, the frontend 130 may determine whether the user ID associated with the user code is a high-volume user responsible for a sufficiently large number of requests sent to the virtual compute system 110. The determination of whether the frequency of execution of the user code exceeds a threshold value may be based on historical data retrieved from a database, live data calculated on the fly, or a combination thereof. The threshold value may be determined automatically by monitoring the trend of user code execution. Alternatively, the threshold value may be set manually to one of many different configuration policies.

If the frontend 130 determines that the one or more code usage criteria have not been satisfied, the routine 400 proceeds to block 406. At block 406, the request is sent to the low frequency fleet of virtual machine instances. On the other hand, if the frontend 130 determines that the one or more code usage criteria have been satisfied, the routine 400 proceeds to block 408. At block 408, the request is sent to the worker manager associated with the frontend 130.

While the routine 400 of FIG. 4 has been described above with reference to blocks 402-408, the embodiments described herein are not limited as such, and one or more blocks may be omitted, switched, or modified without departing from the spirit of the present disclosure. For example, at block 408, the frontend 130 may handle the request instead of sending the request to the worker manager associated with the frontend 130.

Figure 5:
FIG. 5 illustrates an example table including data accessed by a frontend.

Turning now to FIG. 5, an example table maintained either by the virtual compute system 110 or by an auxiliary service 106 of FIG. 1 will be described. As illustrated in FIG. 5, the table 500 includes user code data associated with "CODE A," "CODE B," and "CODE C." The user code data include customer ID (e.g., user ID) of the user associated with the user code, requests per minute, and a usage status of the user code. In the example of FIG. 4, "CODE B" and "CODE C" have been categorized as having a heavy usage status based on their requests per minute. "CODE A" and "CODE B" are associated with the same user (e.g., customer ID of 121), but they have different usage status values. For example, when the request received by the frontend 130 is associated with "CODE A," the frontend 130 may determine that the user code is not sufficiently frequently executed and route the request to a low frequency fleet (e.g., which can also be referred to as a low volume fleet configured to handle those requests that are low in volume). On the other hand, if the received request is associated with either "CODE B" or "CODE C," the frontend 130 may determine that the user code is sufficiently frequently executed, and handle the request in conjunction with a worker manager associated with the frontend 130.

The user code data is not limited to the configuration shown in the example of FIG. 5, and may include any number of parameters that can be used for determining whether the user code is sufficiently frequently executed.

It will be appreciated by those skilled in the art and others that all of the functions described in this disclosure may be embodied in software executed by one or more physical processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storage medium storing the computer executable components such as a CD-ROM, DVD-ROM, or network interface. Further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
as implemented by one or more computing devices configured with specific executable instructions,
receiving a request to execute a first program code on a virtual compute system, the request including a first identifier identifying the first program code requested to be executed on the virtual compute system, wherein the virtual compute system comprises at least a first fleet of virtual machine instances configured to process low volume requests and a second fleet of virtual machine instances configured to process high volume requests;
accessing, based on the first identifier included in the request, first program code data associated with the first program code from an electronic data store, wherein the first program code data indicates first execution frequency of the first program code, wherein the electronic data store is configured to store at least program code data associated with a plurality of program codes, the program code data indicating frequency of execution of the plurality of program codes on the virtual compute system; and
based on the first execution frequency indicated by the first program code data, routing the request to the first fleet of virtual machine instances configured to process low volume requests.

2. The computer-implemented method of claim 1, further comprising:
receiving a request to execute a second program code on the virtual compute system;
accessing, from the electronic data store, second program code data associated with the second program code, wherein the second program code data indicating second execution frequency of the second program code; and
based on the second execution frequency, causing the second program code to be executed on a virtual machine instance selected from the second fleet of virtual machine instances configured to process high volume requests.

3. The computer-implemented method of claim 1, further comprising:
recording, for a program code executed on the virtual compute system, program code data associated with the program code, wherein the program code data at least includes a client ID associated with the program code and a usage status associated with the program code.

4. The computer-implemented method of claim 1, further comprising:
receiving an instruction to adjust a capacity of the first fleet of virtual machine instances; and
adjusting a number of worker managers configured to manage the virtual machine instances of the first fleet based on the received instruction.

5. The computer-implemented method of claim 1, wherein the first execution frequency comprises one or more of (i) a number of times the first program code has been executed on the virtual compute system, (ii) a transactions-per-second value associated with the first program code, and (iii) an indication of whether the first program code is a high-frequency code or a low-frequency code.

6. A system for providing low-latency computational capacity from a virtual compute fleet, the system comprising:
an electronic data store configured to store at least usage data associated with one or more program codes executed on the virtual compute fleet,
wherein the virtual compute fleet comprises a low volume fleet of virtual machine instances configured to process low volume requests and a high volume fleet of virtual machine instances configured to process high volume requests, wherein the low volume fleet contains a group of worker managers, each worker manager configured to manage one or more virtual machine instances of the low volume fleet and has one or more hash values associated therewith; and
one or more hardware computing devices executing a frontend service through specific computer-executable instructions, said frontend service in communication with the electronic data store, and configured to at least:
receive a request to execute a first program code on the virtual compute fleet;
access, from the electronic data store, program code data associated with the first program code to be executed, wherein the program code data is indicative of a first frequency at which the first program code has been executed on the virtual compute fleet;
determine that the first frequency at which the first program code has been executed on the virtual compute fleet does not exceed a threshold frequency;
calculate a specific hash value based on at least a portion of information included in the request;
determine a first worker manager of the group of worker managers of the low volume fleet corresponding to the calculated specific hash value; and
route the request to the first worker manager corresponding to the calculated specific hash value.

7. The system of claim 6, wherein the frontend service is further configured to:
determine that a request to execute a second program code on the virtual compute fleet satisfies one or more usage criteria; and route the request to execute the second program code on the virtual compute fleet to a second worker manager of the high volume fleet that is associated with the frontend service, wherein the second worker manager is configured to manage the virtual machine instances of the high volume fleet.

8. The system of claim 6, further comprising a usage data manager configured to record, for each program code executed on the virtual compute fleet, usage data associated with the program code, wherein the usage data at least includes a client ID associated with the program code and a usage status associated with the program code, wherein the usage data manager is configured to determine the usage status based an execution frequency of the program code.

9. A system, comprising:
an electronic data store configured to store at least program code data associated with a plurality of program codes, the program code data indicating frequency of execution of the plurality of program codes on a virtual compute system, wherein the virtual compute system comprises at least a first fleet of virtual machine instances configured to process low volume requests and a second fleet of virtual machine instances configured to process high volume requests; and
a frontend service comprising one or more hardware computing devices executing specific computer-executable instructions that, when executed, causes the one or more hardware computing devices to at least:
receive a request to execute a first program code on a virtual compute system, the request including a first identifier identifying the first program code requested to be executed on the virtual compute system;
access, based on the first identifier included in the request, first program code data associated with the first program code from the electronic data store, wherein the first program code data indicates first execution frequency of the first program code; and
based on the first execution frequency indicated by the first program code data, route the request to the first fleet of virtual machine instances configured to process low volume requests.

10. The system of claim 9, wherein the frontend service is further configured to:
receive a request to execute a second program code on the virtual compute system;
access, from the electronic data store, second program code data associated with the second program code, wherein the second program code data indicating second execution frequency of the second program code; and
based on the second execution frequency, cause the second program code to be executed on a virtual machine instance selected from the second fleet of virtual machine instances configured to process high volume requests.

11. The system of claim 9, further comprising a usage data manager configured to record, for a program code executed on the virtual compute system, program code data associated with the program code, wherein the program code data at least includes a client ID associated with the program code and a usage status associated with the program code, wherein the usage data manager is further configured to determine the usage status based on how frequently the program code has been executed on the virtual compute system.

12. The system of claim 9, wherein the frontend service is further configured to:
receive an instruction to adjust a capacity of the first fleet of virtual machine instances; and
adjust a number of worker managers configured to manage the virtual machine instances of the first fleet based on the received instruction.

13. The system of claim 9, wherein the first execution frequency comprises one or more of (i) a number of times the first program code has been executed on the virtual compute system, (ii) a transactions-per-second value associated with the first program code, and (iii) an indication of whether the first program code is a high-frequency code or a low-frequency code.

14. The system of claim 9, wherein the frontend service is further configured to, in response to routing the request to the first fleet, determine a virtual machine instance for executing the first program code of the user, at least in part by:
calculating a hash value associated with the request; and
forwarding the request to a worker manager associated with the calculated hash value, wherein the worker manager is configured to manage at least a portion of the first fleet of virtual machine instances.

15. The system of claim 9, further comprising:
one or more additional frontend services each associated with a different fleet of virtual machine instances, wherein the frontend service and said one or more additional frontend services are implemented on separate hardware computing devices located in different logical failure zones implemented at least in different physical data centers, different power grids, different physical racks, different networks, different subnets, different geographic regions, different security boundaries, or different availability zones; and
a load balancer configured to distribute requests to execute program codes on the virtual compute system based on an individual capacity of the frontend services.

16. A computer-readable, non-transitory storage medium storing computer executable instructions that, when executed by one or more computing devices, configure the one or more computing devices to perform operations comprising:
receiving a request to execute a first program code on a virtual compute system, the request including a first identifier identifying the first program code requested to be executed on the virtual compute system, wherein the virtual compute system comprises at least a first fleet of virtual machine instances configured to process low volume requests and a second fleet of virtual machine instances configured to process high volume requests;
accessing, based on the first identifier included in the request, first program code data associated with the first program code from an electronic data store, wherein the first program code data indicates first execution frequency of the first program code, wherein the electronic data store is configured to store at least program code data associated with a plurality of program codes, the program code data indicating frequency of execution of the plurality of program codes on the virtual compute system; and
based on the first execution frequency indicated by the first program code data, routing the request to the first fleet of virtual machine instances configured to process low volume requests.

17. The computer-readable, non-transitory storage medium of claim 16, wherein the operations further comprise:

receiving a request to execute a second program code on the virtual compute system;

accessing, from the electronic data store, second program code data associated with the second program code, wherein the second program code data indicating second execution frequency of the second program code; and causing the second program code to be executed on a virtual machine instance selected from the second fleet of virtual machine instances configured to process high volume requests.

18. The computer-readable, non-transitory storage medium of claim 16, wherein the operations further comprise recording, for a program code executed on the virtual compute system, program code data associated with the program code, wherein the program code data at least includes a client ID associated with the program code and a usage status associated with the program code.

19. The computer-readable, non-transitory storage medium of claim 16, wherein the operations further comprise:

receiving an instruction to adjust a capacity of the first fleet of virtual machine instances; and adjusting a number of worker managers configured to manage the virtual machine instances of the first fleet based on the received instruction.

20. The computer-readable, non-transitory storage medium of claim 16, wherein the first execution frequency comprises one or more of (i) a number of times the first program code has been executed on the virtual compute system, (ii) a transactions-per-second value associated with the first program code, and (iii) an indication of whether the first program code is a high-frequency code or a low-frequency code.

* * * * *

UNITED STATES PATENT AND TRADEMARK OFFICE
CERTIFICATE OF CORRECTION

PATENT NO. : 10,048,974 B1
APPLICATION NO. : 14/502589
DATED : August 14, 2018
INVENTOR(S) : Wagner et al.

Page 1 of 1

It is certified that error appears in the above-identified patent and that said Letters Patent is hereby corrected as shown below:

On the Title Page

Item (72), (Inventors) at Line 2, Change "Derek Steven Manwarin," to --Derek Steven Manwaring,--;

Item (72), (Inventors) at Line 3, Change "Lynwood, WA" to --Lynnwood, WA--.

Signed and Sealed this
Twenty-second Day of January, 2019

Andrei Iancu
*Director of the United States Patent and Trademark Office*